Patented May 12, 1931

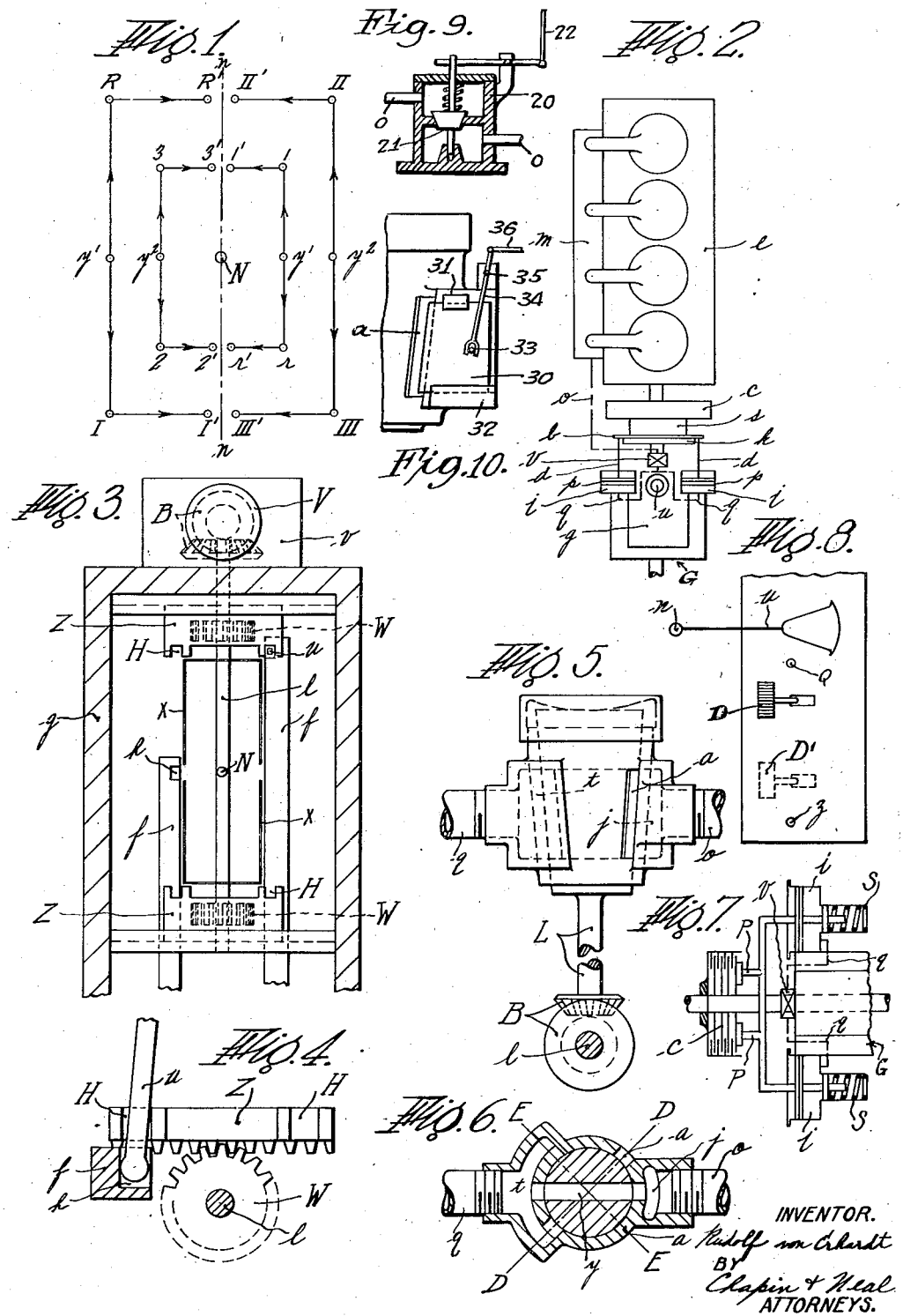

1,805,120

UNITED STATES PATENT OFFICE

RUDOLF von ERHARDT, OF SOUTH HADLEY, MASSACHUSETTS

CONTROL APPARATUS FOR POWER-TRANSMITTING MECHANISM

Application filed February 15, 1929. Serial No. 340,144.

The purpose of the invention is to provide an arrangement, particularly useful in the operation of engine-driven vehicles, but not necessarily confined to them, whereby the shifting of power-transmitting elements, (especially gears, in combination with a clutch for the purpose of changing the torque or speed ratio between the driving and the driven elements) is facilitated and simplified.

It is generally known that the engagement and disengagement of power-transmitting mechanical members will satisfactorily take place only as long as substantially no power is passing through such members. In automobiles it has become standard practice to interrupt and reestablish the power flow on its way from the engine crank shaft through the gear box to the road wheels by means of a frictional clutch inserted between the crank shaft and the gear box. In its normal position the clutch is closed and transmits power. By depressing a pedal—usually with the left foot—the driver opens the clutch or disconnects the power flow to the gear box, thus allowing the gears to shift with subsequent releasing of the clutch pedal to reconnect the power flow. This means that the shifting of a gear requires the coordination of the operation of the gear shift lever with the twofold operation of the clutch pedal. The inconvenience and undesirability of this coordination, ordinarily required by hand and foot manipulation, are widely felt among automobile operators, especially because errors with damaging effects to the car mechanism may easily occur, and also because the actuation of the clutch pedal requires much effort from the driver. Furthermore, to such prior arrangements some automobile accidents may be traced.

To overcome these inconveniences and deficiencies I have conceived the present invention. It consists broadly in the combination of two means: first, of a power-operable clutch which is normally disengaged; secondly, of a control mechanism which is operable for the selection of the proper speed by engaging the proper speed change elements in the gear box and also at the same time coordinates the power operations of the clutch. By uniting these hitherto separated control actions in a single control device the manipulations of the operator are simplified and to such a degree predetermined as to exclude mistakes.

From what I have said it is clear that my idea includes the placing of the gear shifting and clutch operations under the automobile driver's control as he moves the ordinary gear shift lever alone. This he ordinarily does with the right hand. Thus under my invention he no longer need occupy the left foot with the work of shifting the clutch pedal. This fact offers the opportunity for the use of a special accelerator pedal positioned with particular reference to the main features of my invention. I will make the relation of the parts clear in the description to be given later.

This invention provides for variable-speed power plants having a change-speed mechanism operable with substantially disconnected power flow and particularly for automobile engines a power-operable clutch which, at least while revolving, is permanently disengaged beyond the control of the operator as long as the control lever of the change-speed mechanism remains within its operating range for selecting and shifting the various speed ratios of this mechanism, and which clutch can be actuated from said same control lever by moving the lever out of its speed shifting range into a special clutch operating range in which the lever is adapted to engage the power means associated with the clutch. The advantages derived from this arrangement and forming the object of this invention are: first, a clutch manually operable with negligible exertion from the operator and, furthermore, only operable from the change-speed control lever in a special operating range of this lever thus rendering unnecessary all interlocking operations by means of auxiliary latch levers etc. and positively excluding mistakes in the coordination of change-speed and clutch operations, secondly, due to the peculiar operation of the clutch, very simple mechanical constructions for the actuation of the clutch from the combined speed and clutch control lever, which constructions can easily be accommodated in standard car designs. Still another object of the invention is to provide additional regulating means whereby the power operation of the clutch may be adjusted so as to slow up the engaging action of the clutch and produce a decided slip between the clutch members allowing the acceleration of the driven elements or of the vehicle from a higher gear.

For a better understanding of the means embodying my conception (which is quite simple from a structural viewpoint), I refer to the accompanying drawings as illustrative of its pertinent features.

Fig. 1 is a diagram to illustrate the corresponding movements of the upper and lower end of a gear shift lever operated in accordance with this invention;

Fig. 2 is a top view illustrative of an arrangement according to the principle of this invention in an automobile power plant;

Fig. 3 is a top view of a fractional horizontal section through the gear box cover;

Fig. 4 is a fractional view partly in section of the mechanism for the actuation of the control valve;

Fig. 5 is a side view of a control valve as it may be employed with this invention;

Fig. 6 is a cross section of the control valve taken on the line C—C of Fig. 5;

Fig. 7 is a schematic illustration of a preferred clutch spring arrangement;

Fig. 8 schematically shows the arrangement of the various operating devices in an automobile with a preferred duplication of the accelerator pedal so as to have one operable by each foot;

Fig. 9 is a vertical cross-section through an auxiliary throttle valve; and

Fig. 10 shows the arrangement of an auxiliary throttle device in combination with the valve as represented in Fig. 5.

In order to describe the invention in a more detailed way with reference to the illustrations, in the subsequent discussion a specific application and a specific embodiment of the broad invention have been chosen. This is an arrangement in connection with a gasoline-driven automobile with a standard three-speed selective gear transmission and a ball gear shift lever which, besides its normal movements in the shape of the well known H, will allow of certain additional movements, as explained later on. Furthermore, it has been assumed that the power supply for the clutch is taken from the intake manifold of the gasoline engine which affords a considerable under-pressure below atmospheric pressure as long as the engine is running. These limitations, of course, are not meant to confine the application of the invention to conditions as aforesaid. For instance, without departing from the scope of the invention it would be possible to apply the same principles to other drives than gasoline-driven automobiles; also, another power supply may be provided either in conjunction with the organism of the engine or by having a separate power supply unit which may be driven by the engine—for instance an oil pressure or air vacuum pump; or work more or less independently of the engine—for instance solenoids fed from a battery. Also, additional movements of the gear shift lever different from those underlying the following explanations may be employed.

Referring to Fig. 2, $e$ is a four-cylinder gasoline engine with intake manifold $m$, $c$ is a frictional clutch with a closing expansion spring of some common design, $s$ is the housing for the clutch spring, $k$ a collar attached to this housing. G represents the transmission gear box, and $g$ the gear box cover, $u$ the casing for the ball joint of the gear shift lever.

There are mounted on or near the outer sides of the gear or clutch casing two vacuum cylinders $i$, $i$ with pistons $p$, $p$. These pistons, according to the position of the control valve located in the valve box $v$, communicate either with the atmosphere or with the manifold vacuum by means of the connecting pipes $q$, $q$ between the cylinders and the valve, and $o$ between the valve and the manifold. When the cylinders communicate with the vacuum their pistons will be displaced in such a manner as to pull the collar $k$ by means of the piston stems $d$, $d$ and the fork $b$ towards the gear box whereby the clutch spring will be compressed or the clutch be disengaged. If the vacuum is disconnected by the control valve and atmospheric pressure admitted, the clutch spring will expand again and thereby engage the clutch members and pull the pistons back towards the clutch to their original positions.

The control valve is actuated from the lower end of the gear shift lever, that is the end extending into that portion of the gear box that contains the shifting rods and shifter forks, and which is usually called the gear box cover.

Referring to Fig. 1, N indicates the neutral position of the gear shift lever and R, I, II, III indicate various positions of the upper end of the lever when a pair of gears is in mesh. The paths that the hand of the operator describe form together the H. The positions of the lower end of the lever corresponding to those of the upper end are denoted by corresponding Arabic or small characters. As long as the lever is in its neutral position the control valve is in the vacuum position—that is the cylinders communicate with the vacuum in the manifold, and the clutch in this position is open or disengaged so that due to the remaining slight drag of the disengaged clutch the gears can be meshed at any time that the engine is running. After the mesh has been carried out the lever from its extreme or mesh positions R, I, II, III can be led, according to my arrangement, to positions R', I', II', III'. When the lever is taken to one of these positions which lie on or near the longitudinal center line n—n (Fig. 1) of the H, the lower end of the lever will actuate the valve mechanism in such a way that the valve will admit atmospheric pressure and the clutch will be engaged. When the lever is taken back from one of these positions to the corresponding mesh position, the valve admits the vacuum and the clutch will open or disengage again. Either the atmospheric pressure or the vacuum pressure is admitted to the cylinders. This requires that two valves are operated simultaneously, one of which admits the atmosphere while the other shuts off the vacuum, and vice versa. If a single valve be employed, both operations must be simultaneously combined in it. In the following description a single combination valve has been chosen for illustration, as depicted in Figs. 5 and 6.

The valve belongs to the cock valve type. When the cock is in the position as shown in Fig. 6 the intake manifold and the vacuum cylinders will communicate by means of the pipe lines o and q or the valve pockets j and t, respectively, and the clutch will be disengaged. If the cock is turned about 45° one way or the other, the cock hole y will coincide with the axis D—D or E—E, respectively. In both these positions the pocket t will through one of the ports a directly communicate with the atmosphere with the effect that the clutch will engage. The reason why two atmospheric positions have been provided will become evident in connection with the subsequent description, referring to Figs. 3 and 4. The valve is mounted on a vertical spindle L (see Fig. 5). This spindle is rotated by means of the bevel gear B from the horizontal shaft l.

The assembling of the valve V, the bevel gear B, and the shaft l in connection with the gear box cover g is shown in Fig. 3. The shaft l extends into the gear box cover, and its axis coincides with the line of symmetry of this cover. Two gears W, W are mounted on this shaft—see also Fig. 4. These gears engage two racks Z, Z. These racks can laterally slide on their supoprts so that from their middle position, as shown in Fig. 3, they can be shifted sidewise either way by the lower end of the gear shift lever. When one of these shifts takes place the valve will be turned one way or the other to one of its atmospheric pressure positions.

Referring to Fig. 4, u is the lower end of the gear shift lever which engages the notch h of one of the change speed shifter rods f in the usual manner. In Fig. 3 the left hand shifter rod is shown in its neutral position, and the right-hand rod as having completed the gear mesh corresponding to mesh position I, in Fig. 1.

As can be better seen from Fig. 4 the lever in each of its extreme or mesh positions will engage at the same time in the corresponding rack notch H, and since the lever in these positions is free to laterally pass out of the notch of the gear shifter rod the engaged rack can be moved sidewise towards the line of symmetry n—n. This will have the effect that the valve will admit atmosphere and that the clutch will engage. If the lever is taken back the same way to its mesh position, the valve will be rotated in the opposite direction and reestablish the vacuum in the cylinders or disengage the clutch again. For the proper guidance of the lever guide frames x, x are arranged along the lever paths with passages that permit the swinging of the gear shift lever to its central positions. The central and two lateral positions of the racks are secured by spring bolts or by similar known means. Since it requires but little effort to operate the valve the distances to be traversed for this operation by the lower end of the lever can be kept very small, and sufficient angular displacements of the valve can be obtained by a proper transmission ratio of the bevel gear.

It will be understood that the structure as described before represents only one of the various possible embodiments of the invention when applied to gasoline-operated automobiles.

It is evident that the simplicity of construction and the absence of any interlocking means such as were required in former constructions serving similar purposes is the result of the reversed principle of clutch operation whereby the power flow through the change-speed mechanism as an obstacle to the free selection of a desired speed ratio is permanently eliminated. With my arrangement the gear shift lever may, at any time, freely be moved from its neutral position to make a selected mesh and then break it just as freely, and there will be involved in such movements no operation of the clutch. A selector or joint control device (normal gear shift lever arm) according to this invention is, therefore, characterized by having two operating ranges, one operating range which serves exclusively for establishing a desired speed ratio or interrupting it, and another operating range accessible only from the first named range and only when a definite speed ratio is established, which latter range serves exclusively the purpose of operating the clutch by action on the control means (valves or the like) of the clutch power means (pneumatic cylinders or the like). This action must be such that, when the selector is moving into this second range, the clutch will engage and thereby close the power flow for the previously established mesh and, when the selector is moving out, the clutch will re-disengage or return to normal condition thereby interrupting again the power flow before the meshed gears can be separated. In other words, the clutch or its control means respectively are operable from the joint control device only outside its change-speed operating range. In a standard gear shift lever this change-speed operating range has the form of an H. Any strokes of the lever issuing from the four corners or mesh-establishing positions of the H and not coincident with the lines of the H could, therefore, be employed as operating ranges for the actuation of the clutch.

As has been pointed out previously, it is immaterial with this principle from where the power for the operation of the clutch is taken, whether it is taken from an independent source or from the engine directly or indirectly. The principle of this invention will be present, indeed, in any arrangement where the power means of the clutch are so governed that the revolving clutch is disengaged (normal condition) as long as the clutch control lever is within its speed-shifting range and that the clutch can only be engaged by a voluntary movement of the control lever out of its speed shifting range into the clutch operating range, whereby the governing means for the clutch power means will be actuated in such a manner as to induce the engaging action of the clutch. If, for instance, an independent pump is employed the arrangement may be such that the clutch is normally held disengaged due to the absence of a compression spring in connection with the clutch, and that the clutch will engage under the action of a cylinder piston mechanism energized from said pump when the shift lever is moved into its clutch operating range and made to actuate the valves of the cylinder for its energization from the pump.

As the simplest and most preferable arrangement according to the principle of this invention I consider, at the present time at least, the arrangement as described heretofore, since in this design the power for holding the clutch normally disengaged is derived directly from the engine intake action (manifold) without any additional cost, while the power for engaging the clutch is given by the unvariable force of the compression spring.

Instead of having the spring for the compression of the clutch located in the clutch itself it may in connection with this arrangement be found more convenient to assemble the spring or a number of springs with the vacuum cylinders. For instance, the springs could be placed in the interior of the cylinders, as illustrated in Fig. 7. This would have the advantage that the structure of the clutch would become more simple, and that the overall dimensions of the clutch aggregate would be reduced.

In Fig. 7 the springs S, S are shown in their expanded state so that the stems P, P will compress the disks of the clutch c and thereby engage the clutch. As soon as the vacuum is admitted through the ducts $q$, $q$ the springs are compressed, and the clutch will disengage.

The duration of the opening and closing action of the clutch may be made adjustable by a throttling device such as a throttle valve. Such a throttling device may be inserted in the connection $q$ between the control valve and the cylinders, and be set on a position according to the preference of the operator. Or, such throttling devices may be arranged in the ducts $o$ leading from the intake manifold to the control valve, and before the ports $a$, $a$, whereby it would be possible to influence the opening and closing action of the clutch independently of one another. How such independent throttling devices could be arranged in the pipe line $o$ and in connection with the open air ports of the valve is represented in Figs. 9 and 10, respectively. In Fig. 9 the valve casing 20 is inserted between the pipe line $o$ coming from the manifold. The position of the movable valve member 21 may be adjusted by means of several lever links operable by a rod 22 from the instrument panel of the car. If the valve is held only slightly open, the time for building up a rarefaction in the cylinder of the clutch is lengthened and the clutch will disengage more gradually than at widely open valve without influencing the time for the engaging action of the clutch. Fig. 10 shows the right side portion of the actuating valve Fig. 5 with one of the atmospheric ports $a$. A plate 30 is laterally slidably held between two overlapping parts 31 and 32 which are integral with the valve casing or attached thereto in some suitable manner. Corresponding elements are provided for the second symmetrically located atmospheric port. The ends of a bifurcated lever 34 journalled at 35 engage pins 33 of the slidable plates 30. A connecting link 36 can be actuated from the instrument panel of the car. By rocking the lever arrangement, the two plates can be simultaneously shifted to positions which more or less close the effective area of the atmospheric ports, whereby the air current passing through them to fill the vacuum in the clutch cylinders is more or less retarded. This results in a slower or faster engaging or closing action of the clutch independent of the duration of the disengaging action. It is obvious that irrespective of such additional equipment the driver has already a means of retarding or accelerating the clutch operation in this design by moving the lever more or less gradually. In the latter case the driver would be enabled to temporarily adjust the closing action of the clutch in such a manner as to produce a slip of the clutch sufficiently great to make it possible to start the car immediately from high gear, if under certain driving conditions such a mode of operation would seem to be preferable, provided of course, that the construction of the clutch would permit of such an operation.

With this or a similar arrangement, according to the invention, one of the feet (usually the left one) of the driver is permanently free. Therefore, in order to fully utilize the possible advantages of this fact a second accelerator pedal may be provided. It is a known fact that many drivers feel a great fatigue and strain all over their body because of constantly holding the same foot on the one accelerator. With two accelerator pedals so arranged that they could be alternately operated, the one by the left foot and the other by the right foot, the driver would be able to change from one pedal to the other at his convenience. Fig. 8 is a diagrammatic illustration of such an arrangement as viewed from the driver's seat. $u$ is the gear shift lever, D the brake pedal, Q the accelerator pedal, and $z$ its duplicate that can be operated by the left foot. D' is the ordinary clutch pedal that may be provided with its usual connections (not shown) for operating the clutch by foot power whenever that may be desirable for any reason.

Some of the advantages of the invention may be briefly mentioned. It makes an improved gear shifting means. It protects the electric battery of the car from exhaustion especially in cold weather since the clutch and the high frictional resistances of the transmission gear connected therewith are automatically disconnected as soon as the engine starts up. It provides an additional facility for the women automobile operators, less human coordination on the part of all drivers, less fatigue in heavy traffic driving, and the particular structure shown for one illustrative purpose can be put on the modern automobile without disturbance to its present standards of arrangement.

One advantage might be overlooked if not particularly mentioned. It is in the added facility to move the automobile out of danger when operating under confusing traffic conditions. It is common practice then to have both hands and both feet either busy or tensely ready to act. Usually the left hand is on the steering gear, the right hand on the gear shift lever, the left foot on the clutch pedal and right foot hovering between the brake pedal and the accelerator pedal. The permutations and combinations for operation under these conditions make a complicated situation important to simplify. When the operator is able to make a decision he wants to put it in action and the split fraction of a second is then important to him. His ordinary difficulty is whether to brake or accelerate with the right foot. Assume he decides to accelerate and jump out of danger instead of apply the brake, but there is a fifty per cent chance that his right foot is on the brake pedal when it should be on the accelerator for instant action. Usually his left foot is on the clutch pedal to work that when the brake foot works. Now, by my arrangement he can throw the clutch in or out by the gear shift lever in his right hand, brake or not with his right foot constantly in one position, steer with his left hand, and accelerate or not with his left foot in one position over the special accelerator pedal I have provided. Thus there is a new coordination for quicker automobile control due to the position of the special accelerator pedal and the fact that this position is rendered particularly useful by controlling the clutch operation with the gear shift lever. The result is much the same as if I had provided the operator in his difficulties with a fifth limb (an extra right foot) that he can coordinate with his normal four limbs to give quicker effect to his decision. It is obvious that the special accelerator provided in the automobile control for the left foot in addition to or instead of the right foot accelerator may have some other advantages. For example, with an accelerator for each foot, leg and other fatigue is avoided by alternating their use, particularly on long drives. The means for getting these advantages, I wish to claim as subsidiary features to some of my other features in coordinating the new clutch operating means with the special accelerator.

Another advantage that might be overlooked is in the facility of starting or changing gears on a hill. The gear shift lever operates the clutch, the right foot on the brake pedal holds the car from slipping back and the left foot accelerates by the special accelerator pedal. It will be recognized that changing gears on a hill or starting on a hill presents a danger and difficulty in present day automobile construction which my improvement overcomes in a nice way.

Having described the principles of my invention and one preferred means for putting them in effect, I desire to claim all the novel features shown as effectively as the prior art and the interpretation of the following claims will permit.

I claim:

1. The combination with an engine-driven vehicle or the like comprising an internal combustion engine with intake manifold and a power-transmitting change-gear mechanism operable for speed change at substantially disconnected power flow, of a clutch coupled to said change-gear mechanism for connecting or disconnecting the power flow therethrough with the clutch revolving, a spring connected to the clutch with the tendency of engaging the same, a cylinder-piston mechanism connected energizably to said intake manifold and operatively to said clutch, valve means associated with said cylinder-piston mechanism for governing the same, a joint control lever for said change-gear mechanism and said valve means adapted to operate, within a normal H speed-shifting range, the change-gear mechanism for selecting and shifting the gear ratios and to actuate, within special clutch operating ranges extending from the four corners of the H-range, said valve means; the revolving clutch, while the control lever is in its H shifting range, being permanently held disengaged by an automatic energization of said cylinder-piston mechanism from the manifold overcoming said tendency of the spring and being engageable only by actuating said valve means from the joint control lever in its clutch operating range for interruption of said energization of the cylinder-piston mechanism.

2. The combination with an engine-driven vehicle or the like comprising an internal combustion engine with intake manifold and a power-transmitting change-gear mechanism operable for speed change at substantially disconnected power flow, of a clutch coupled to said change-gear mechanism for connecting or disconnecting the power flow therethrough with the clutch revolving, a cylinder-piston mechanism connected energizably to said intake manifold and operatively to said clutch, a spring connected to said cylinder-piston mechanism with the tendency of displacing the piston for engaging action of the clutch, valve means associated with said cylinder-piston mechanism for governing the same, a joint control lever for said change-gear mechanism and said valve means adapted to operate, within a normal H speed-shifting range, said change-gear mechanism for selecting and shifting the gear ratios and to actuate, within special clutch operating ranges extending from the four corners of the H range, said valve means; the revolving clutch, while the control lever is in its H shifting range, being permanently held disengaged by an automatic energization of said cylinder-piston mechanism from the manifold overcoming said tendency of the spring and being engageable only by actuating said valve means from the joint control lever in its clutch operating range for interruption of said energization of the cylinder-piston mechanism.

3. The combination with a power-transmitting change-speed mechanism operable for speed change at substantially disconnected power flow, of a clutch coupled to said change-speed mechanism for connecting or disconnecting the power flow therethrough with the clutch revolving, a power means operatively connected to the clutch and associated with governing means, a joint control device for said change-speed mechanism and said clutch power means adapted to operate, within a speed shifting range, said change-speed mechanism for selecting and shifting its speed ratios and to actuate, within a special clutch operating range, said governing means of the clutch power means; said clutch, at least when revolving, being permanently disengaged while said joint control device is within its speed shifting range and being engageable only from the joint control device in its clutch operating range by actuating said governing means; said power means being furthermore associated with manually adjustable regulating means adapted to retard or accelerate the action of said power means on said clutch.

4. The combination with a change-speed gear transmission mechanism including a clutch therefor, of a control device for shifting gears of said transmission mechanism, said control device presenting a single movable element to the operator's hand, means for relieving said movable element from any force reactions substantially exceeding those set up between the cooperating faces of said gear transmission mechanism while said mechanism is being operated with said clutch in disengagement, said means including instrumentalities whereby after operatively establishing a chosen speed ratio by said single movable element a further movement of the said single movable element will engage and the reversal of said further movement re-disengage said clutch.

5. The combination with a change-speed gear transmission mechanism including a clutch therefor, of a control device for shifting gears of said transmission mechanism, said control device presenting a single movable element to the operator's hand, means for relieving said movable element from any force reactions substantially exceeding those set up between the cooperating faces of said gear transmission mechanism while said mechanism is being operated with said clutch in disengagement, said means including instrumentalities whereby after operatively establishing a chosen speed ratio by said single movable element a further movement of the said single movable element will engage and the reversal of said further movement re-disengage said clutch, said further movement and said reversed movement involving a change of direction relative to the direction of the gear shifting movement preceding or following respectively said movements.

6. As a subcombination for use in an automobile or the like, the combination with a change-speed gear transmission mechanism, of a control device for shifting gears of said mechanism, said control device presenting a single movable element to the operator's hand, power means for relieving said movable element from any force reactions substantially exceeding those set up between the cooperating faces of said gear transmission mechanism while said mechanism is being operated at substantially no power flow therethrough, a device for controlling said power means, and instrumentalities for actuating said power controlling device upon further movement of said single movable element after said gears are fully meshed, said further movement involving a direction other than the direction controlling the shifting of said gears.

7. The combination with a change-speed gear transmission mechanism of a power-operated clutch, a selective means for jointly controlling the speed ratios of said transmission mechanism and the operation of said clutch, instrumentalities whereby said selective means is relieved from any force reactions substantially exceeding those set up between the cooperating faces of said gear transmission mechanism while said mechanism is being operated with said clutch in disengagement, said instrumentalities including means whereby the operating positions of said selective means include a position determining an operatively established speed ratio of said transmission mechanism coexistent with disengaged relation of said clutch which disengaged clutch relation is unalterable as long as said selective means remains in said position and which position is maintained without the operator's aid.

8. The combination with a change-speed gear transmission mechanism including a power-operated clutch therefor, of a shifting device including a shifting rod for operatively shifting a gear of said transmission mechanism, a second shifting rod for operating instrumentalities controlling the operation of said power-operated clutch, and a common control device for operating said two shifting rods, said control device presenting a single movable element to the operator's hand and being adapted to engage and to independently operate either of said rods.

9. The combination with a change-speed gear transmission mechanism including a clutch therefor, of a control device for shifting gears of said transmission mechanism, said control device presenting a single movable element to the operator's hand, means for relieving said movable element from any force reactions substantially exceeding those set up between the cooperating faces of said gear transmission mechanism while said mechanism is being operated with said clutch in disengagement, said means including instrumentalities whereby after operatively establishing a chosen speed ratio with said single movable element a further movement of the said single movable element will engage and reversal of said further movement re-disengage said clutch, and means for adjustably altering the quickness of response of said power means.

10. In an automobile or the like including a motivating engine having a power control means, a change-speed transmission mechanism, a power-operated clutch therefor, a selective means for jointly controlling the speed ratios of said transmission mechanism and the operation of said clutch, instrumentalities whereby said selective means is relieved from any force reactions substantially exceeding those set up between the cooperating faces of said transmission mechanism while said mechanism is being operated with said clutch in disengagement, said instrumentalities including means whereby the operating positions of said selective means include a position determining an operatively established speed ratio of said transmission mechanism co-existent with disengaged relation of said clutch which disengaged clutch relation is unalterable as long as said selective means remains in said position, and a plurality of foot-operable means for influencing said power control means.

11. The combination with a vehicle or the like including a motivating engine and a change-speed transmission mechanism, of a clutch, power means for actuating said clutch, governing means for controlling said power means, said power means and governing means being arranged to provide a normally disengaged relation of said clutch without the operator's aid at least as long as said engine is operatively revolving, a selective device for coordinatingly controlling the speed ratio of said transmission mechanism and the operation of said clutch, and instrumentalities linking said governing means and said selective device for operating the former from the latter, whereby said disengaged condition of said clutch may be altered by a movement of said selective device having no influence on the condition of said change-speed transmission mechanism.

12. The combination in a vehicle or the like including a motivating fluid-operated power plant and a change-speed transmission mechanism, of a clutch, power means for actuating said clutch, governing means for controlling said power means, said power means being energized by driving fluid diverted from said power plant, said power and governing means being arranged to maintain a normally disengaged relation of said clutch as long as fluid energy is available from said power plant, a selective device for coordinatingly controlling the speed ratio of said transmission mechanism and the operation of said clutch, and instrumentalities linking said governing means and said selective device for operating the former from the latter, whereby said disengaged condition of said clutch may be altered by a movement of said selective device having no influence on the condition of said change-speed transmission mechanism.

In testimony whereof I have affixed my signature.

RUDOLF von ERHARDT.